No. 623,135. Patented Apr. 18, 1899.
G. E. CORDEAU.
CHECK VALVE FOR AIR.
(Application filed May 4, 1898.)

(No Model.)

WITNESSES:

INVENTOR.
Gaston E. Cordeau,
BY
HIS ATTORNEY.

UNITED STATES PATENT OFFICE.

GASTON E. CORDEAU, OF NEW YORK, N. Y., ASSIGNOR TO GEORGE F. WILSON, OF SAME PLACE.

CHECK-VALVE FOR AIR.

SPECIFICATION forming part of Letters Patent No. 623,135, dated April 18, 1899.

Application filed May 4, 1898. Serial No. 679,662. (No model.)

*To all whom it may concern:*

Be it known that I, GASTON E. CORDEAU, a citizen of the United States of America, and a resident of New York, county of Kings, State of New York, have invented certain new and useful Improvements in Check-Valves for Air, of which the following is a specification.

My invention relates to improvements in check-valves for air adapted to be secured in the end of a tubing or flexible hose connected with a storage-tank containing compressed air, the object being to prevent its escape when the valve is not in use for inflating tires for pneumatic vehicles.

To fully explain my invention, I refer to the accompanying drawings, which form part of this specification, in which—

Figure 1:
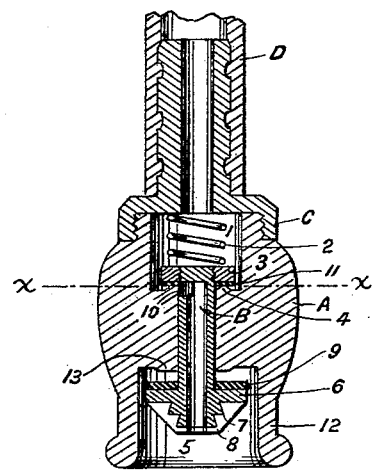
Figure 2:
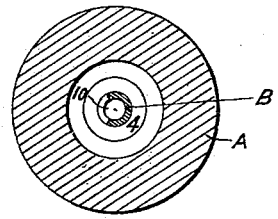
Figure 3:
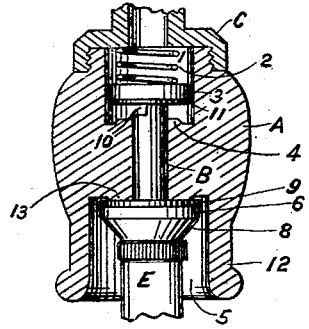

Figure 1 is a longitudinal sectional view through the center of my improved check-valve, the valve being closed. Fig. 2 is a cross-section of Fig. 1 through line X X. Fig. 3 shows the valve and stem in operation open for the passage of air, the body being shown in section.

Similar letters and numbers of reference refer to similar parts in the several views.

A is the body of the check-valve, made of brass or other suitable metal. A hole is drilled lengthwise through the center to act as a guide for the tubular valve-stem B and to retain the same in position. At the upper end the hole in the body is enlarged so as to form a chamber for the inclosing of a spiral spring 2 and a disk valve 3. At the bottom of this upper chamber an annular seat 4 is provided upon which the upper valve closes. A chamber 5 for the lower valve is provided, as shown.

It will be noticed that the valve is a double one, sliding within the body or casing shell, the air being shut off at the top when not in use for inflating pneumatic tires and closed off by the lower valve between the flange and the body to avoid leakage of air at that point when in use for inflating.

The valve is composed of a tubular extension B, closed at the top, having a flange 6 at the lower end, which may be provided with several steps 7 for the purpose of securely holding a soft-rubber cone 8 in place. A washer 9 is placed above the flange to make an air-tight joint between the flange and the body when pressure is brought to bear against the cone, as shown in Fig. 3. A slot 10 is milled or filed across the upper end of the tubular extension B, close up under the disk valve 3, so as to afford a passage for air into the tubular stem. A disk valve is secured on the upper end of the tubular extension, a thin washer 11, of leather, fiber, or rubber, being placed upon the tube under the disk to make an air-tight joint when the spiral spring or the air-pressure within the hose presses down on the disk, as shown in Fig. 1. The area of this disk being many times greater than the area of the hole through the stem B, the air-pressure in the hose above the disk will keep the upper valve closed without the use or need of any additional power, such as a spring would afford. A hose-nipple C is screwed down on the upper end of the body, as shown.

By forming a cavity or chamber 5 at the lower end of the body the valve is protected by an annular wall 12, so that it cannot be tampered with by a knife or any other tool and so that when dropped on a hard floor, such as a stone sidewalk, the valve will not be bruised or injured.

Such being the construction, the operation is as follows: When the tube D is connected with a storage-tank containing compressed air, the air-pressure within the hose, as well as the spiral spring, will keep the upper valve closed. To inflate a tire, the rubber cone is pressed down upon the tire-nipple E, the body or casing A being held in the hand, this action tending to press the valve and its stem inward, raising the upper valve from its seat. The air passes through the hole or slot 10 down through the tubular stem and into the tire-nipple, the soft-rubber cone preventing its escape between itself and the nipple, and the washer 9 above the flange being seated against the roof or seat 13 of the lower chamber prevents an escape of air at that point. When the desired quantity of air or pressure is attained in the tire, the downward pressure on the body is relinquished, when the air-pressure within the hose above the valve and the resiliency of the spiral spring automatically closes off the air.

Such being the construction and operation of my improved check-valve, what I claim as new, and desire to secure by Letters Patent of the United States, is—

1. In a check-valve for air, the combination of a body having a longitudinal passage-way through the center, and an enlarged valve-chamber at both its upper and lower end, of a tubular valve-stem having a sliding movement within said passage-way, the said tubular stem being closed at its upper end and having an orifice under the upper valve for the admission of air, an upper and a lower disk valve, the lower valve being provided on its outer face with a hollow cone of soft rubber substantially as shown and described.

2. In a check-valve for air, the combination of a body A and a double-acting sliding valve, composed of an upper and a lower disk valve, a tubular stem B closed at its upper end, having an orifice as 10 for the admission of air with a soft-rubber cone, positioned below the lower valve, the said double-acting valve being limited in its movement by an upper and a lower valve-seat within the enlarged valve-chambers, substantially as shown and described.

3. In a check-valve for air the combination of a body A of a double-acting valve composed of an upper and a lower disk valve operatively connected together by a tubular valve-stem B having an opening as 10 therein below the upper valve, a spiral spring inclosed within the upper chamber of said body, the said body having its lower valve-chamber recessed so as to leave an annular wall 12 for the purpose specified.

4. In a check-valve for air a body having an upper and a lower valve-chamber provided with annular seats, a passage-way through the center of said body whereby the upper and lower chambers are connected, an upper and a lower disk valve united by a tubular stem which is closed at its upper end and having an opening close up under the upper valve for the admission of air into the tubular stem, a spiral spring inclosed within the upper chamber said spring pressing down upon the upper disk valve, and a soft-rubber cone mounted upon and below the lower disk valve substantially as shown and described.

5. In a check-valve for air the combination of a body provided with an upper and a lower valve-chamber, a passage-way drilled centrally through the body connecting said upper and lower valve-chambers, of a sliding tubular valve-stem, uniting an upper and a lower disk valve, said valves closing alternately upon seats formed in the said upper and lower valve-chambers of a series of steps forming part of the lower valve disk or flange upon which steps a soft-rubber cone is mounted all arranged substantially as shown and described.

Signed by me this 5th day of April, 1898.
GASTON E. CORDEAU.

Witnesses:
E. F. GENNERT,
JOHN A. MCKAY.